(12) United States Patent
Milton

(10) Patent No.: US 10,551,690 B2
(45) Date of Patent: Feb. 4, 2020

(54) ELECTRO-ACTIVE LENS WITH RESISTIVE ARCS

(71) Applicant: e-Vision Smart Optics, Inc., Sarasota, FL (US)

(72) Inventor: Harry Milton, St. Petersburg, FL (US)

(73) Assignee: e-Vision Smart Optics, Inc., Sarasota, FL (US)

( * ) Notice: Subject to any disclaimer, the term of this patent is extended or adjusted under 35 U.S.C. 154(b) by 48 days.

(21) Appl. No.: 16/003,670

(22) Filed: Jun. 8, 2018

(65) Prior Publication Data

US 2019/0086741 A1 Mar. 21, 2019

Related U.S. Application Data

(60) Provisional application No. 62/559,810, filed on Sep. 18, 2017.

(51) Int. Cl.
| | | |
|---|---|---|
| *G02F 1/1343* | (2006.01) | |
| *G02F 1/1345* | (2006.01) | |
| *G02F 1/29* | (2006.01) | |
| *G02F 1/1333* | (2006.01) | |

(52) U.S. Cl.
CPC ...... *G02F 1/134309* (2013.01); *G02F 1/1345* (2013.01); *G02F 1/13439* (2013.01); *G02F 1/133345* (2013.01); *G02F 1/29* (2013.01); *G02F 2001/294* (2013.01)

(58) Field of Classification Search
CPC ............. G02F 1/134309; G02F 1/1345; G02F 1/133345; G02F 1/13439; G02F 1/29; G02F 2001/294
See application file for complete search history.

(56) References Cited

U.S. PATENT DOCUMENTS

| | | | |
|---|---|---|---|
| 7,532,303 | B2 | 5/2009 | Kato |
| 8,154,804 | B2 | 4/2012 | McGinn |
| 8,333,470 | B2 | 12/2012 | Blum |
| 9,280,020 | B2 | 3/2016 | Bos |
| 9,470,937 | B2 | 10/2016 | Li |
| 9,690,118 | B2 | 6/2017 | Etzkorn |

FOREIGN PATENT DOCUMENTS

WO    WO14105814    7/2014

*Primary Examiner* — Jack Dinh
(74) *Attorney, Agent, or Firm* — Michael Haynes PLC; Michael N. Haynes

(57) ABSTRACT

Certain exemplary embodiments can provide a system, machine, device, manufacture, circuit, composition of matter, and/or user interface comprising and/or related to a tunable electro-optic lens device comprising a first substrate comprising a first electrode layer that comprises a first plurality of ring electrodes that form a first resistive divider network, and a second substrate comprising a second electrode layer.

21 Claims, 10 Drawing Sheets

ELECTRO-ACTIVE LENS WITH RESISTIVE ARCS

BRIEF DESCRIPTION OF THE DRAWINGS

A wide variety of potential, feasible, and/or useful embodiments will be more readily understood through the herein-provided, non-limiting, non-exhaustive description of certain exemplary embodiments, with reference to the accompanying exemplary drawings in which.

DESCRIPTION

Figure 1:
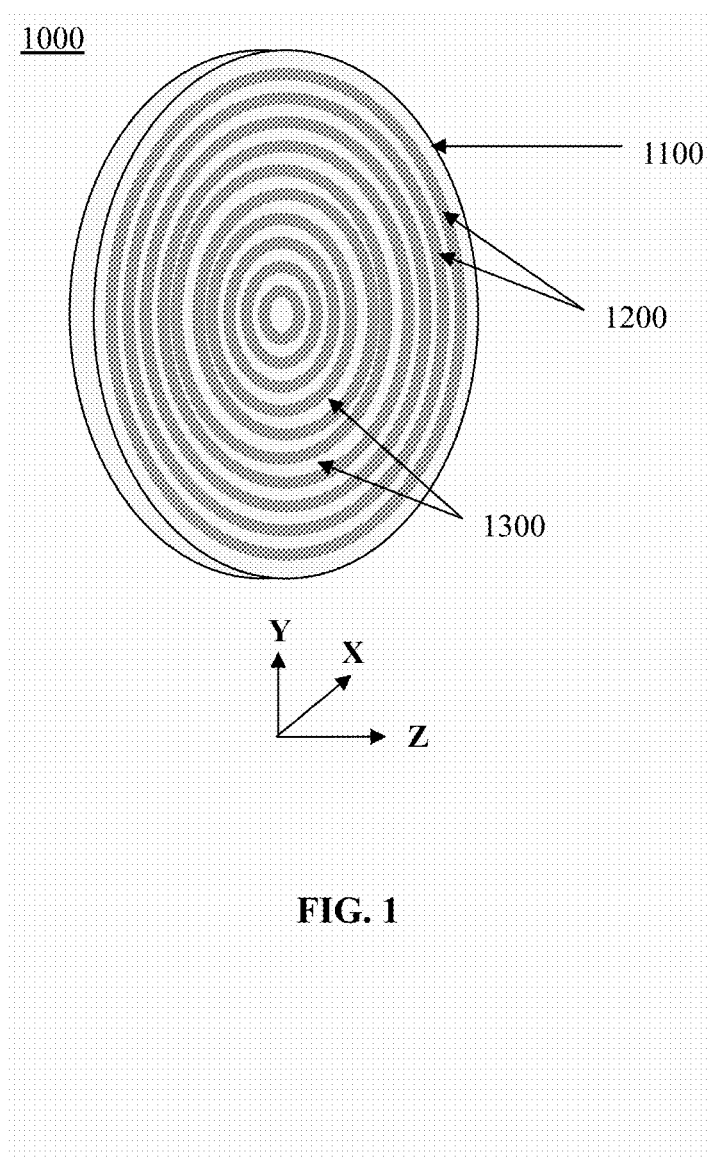
FIG. 1 is a perspective view of an exemplary electro-active lens 1000.

Electro-active lenses are optical devices that can modify the wavefront of light in response to an electrical signal to form lenses that are variable in optical power. Such lenses can utilize a birefringent material such as liquid crystal ("LC") to achieve gradients in their index of refraction. Designs for such LC lenses can be based on various architectures such as kinoform relief patterns fabricated into, on, and/or with on a transparent substrate, lens-shaped cavities filled with variable-index birefringent material, and/or patterned transparent electrodes structures grown, deposited, applied, and/or etched on substrates. In the last example, substantially concentric, transparent, and/or ring-like electrodes, and/or linear electrodes for cylindrical lenses, most commonly built using indium tin oxide (ITO) and/or substantially separated by gaps in the ITO and/or insulators, can be used to create a gradient in the electric field across a liquid crystal layer. This field can create a gradient in the index of refraction, which, if properly established, can result in lensing action in the device.

Increasing the number of electrodes in the device can give a high-resolution gradient index profile across the lens, and subsequently can produce a smoother wavefront of light, improving optical performance.

Yet increasing the number of electrodes in turn can make the device more complex, potentially necessitating finer features and/or more input and/or powering and/or voltage source connections/conductors, which can be opaque and/or reduce the optical performance of the devices. A potential solution to this problem is significantly reducing the number of voltage source connections compared to the number of electrodes, such as by using resistive links to connect adjacent electrodes together, and/or distributing the voltage between two voltage source connections across several electrodes discretely. Example resistive link designs appear in the following U.S. patent documents, each of which is incorporated herein both in its entirety and in those parts relevant to designing, making, and using electro-active lenses generally and more specifically, electrodes, voltage source connections, and resistive links: U.S. Pat. Nos. 9,470,937; 7,532,303; 8,154,804; 9,280,020.

With certain resistive link designs, it can be challenging to provide sufficiently high resistance between electrodes. Failure to provide sufficient resistance between electrodes can degrade optical performance, which can be due to reduced discretization of the voltage profile across electrodes. Increased cross-talk can be prevalent between voltage source connections that power multiple electrodes. Cross-talk can effectively lower the effective optical power and/or increase the electrical power consumption of the device. Resistive links can, at least indirectly, electrically connect voltage source connections to each other, and hence there can be a substantial flow of current between those voltage source connections. The higher the current flow, the greater the energy needed to operate the device over a desired time period. Increasing the resistance between electrodes can help mitigate these challenges.

One possible approach is to use high resistance materials to link electrodes that are separated by insulators and/or gaps in the electrode material. However, this can add an additional layer to the liquid crystal device, which can require further lithographic processing and/or thin film deposition, which in turn can increase manufacturing complexity and/or cost.

Certain exemplary embodiments can provide a method of producing high resistance links in a single conductive layer by utilizing a specialized geometry. In certain exemplary embodiments, the impact of the resistive links on the optical quality and/or wavefront distortion can be minimized by forming the resistive link as a thin "spiralesque" (defined herein) arc that is oriented substantially parallel to the structure of neighboring and substantially concentric and/or ring-like electrodes, is substantially parallel to a gap formed between those electrodes, is in substantially the same plane as those electrodes, and/or substantially fills an area between overlapping portions of the gap between those electrodes. Thus, along nearly any radius extending from an approximate center of an electrode layer and/or the electrodes to an outer circumference or perimeter of the liquid crystal lens, that radius can substantially perpendicularly intersect neighboring electrodes, a gap between those electrodes, and one or more spiralesque resistive arcs connecting neighboring electrodes. Potentially depending on the dimensions of the overlapping portion of the gap between neighboring electrodes, the dimensions of such a resistive arc design can be sufficiently long, sufficiently thin, and/or sufficiently shallow to allow vastly increased resistance between electrodes, which can reduce cross-talk and/or power consumption for the liquid crystal lens and/or device.

FIG. 1 is a perspective view of an exemplary substantially thin, circular, and/or disk-like electro-active lens 1000, and illustrates a substantially transparent, electrically non-conductive, thin, circular, and/or disk-like substrate 1100 upon which substantially concentric, annular, ring-like, electrically conductive, and/or and/or electrically resistive electrodes 1200, those electrodes 1200 separated by substantially concentric, annular, and/or ring-like electrically non-conductive gaps and/or insulators 1300. Electrodes 1200 can be formed from ITO that has been deposited on substrate 1100. Gaps 1300 can be formed by an absence of such ITO deposition, an etching away of ITO down to substrate 1100, and/or deposition of an insulating material. FIG. 1 illustrates an orientation of an X-Y-Z coordinate system used in most or all figures of this application, where substantially ring-like electrodes 1200 extend substantially in an X-Y extending plane, and are layered in the Z direction upon substrate 1100.

Figure 2:
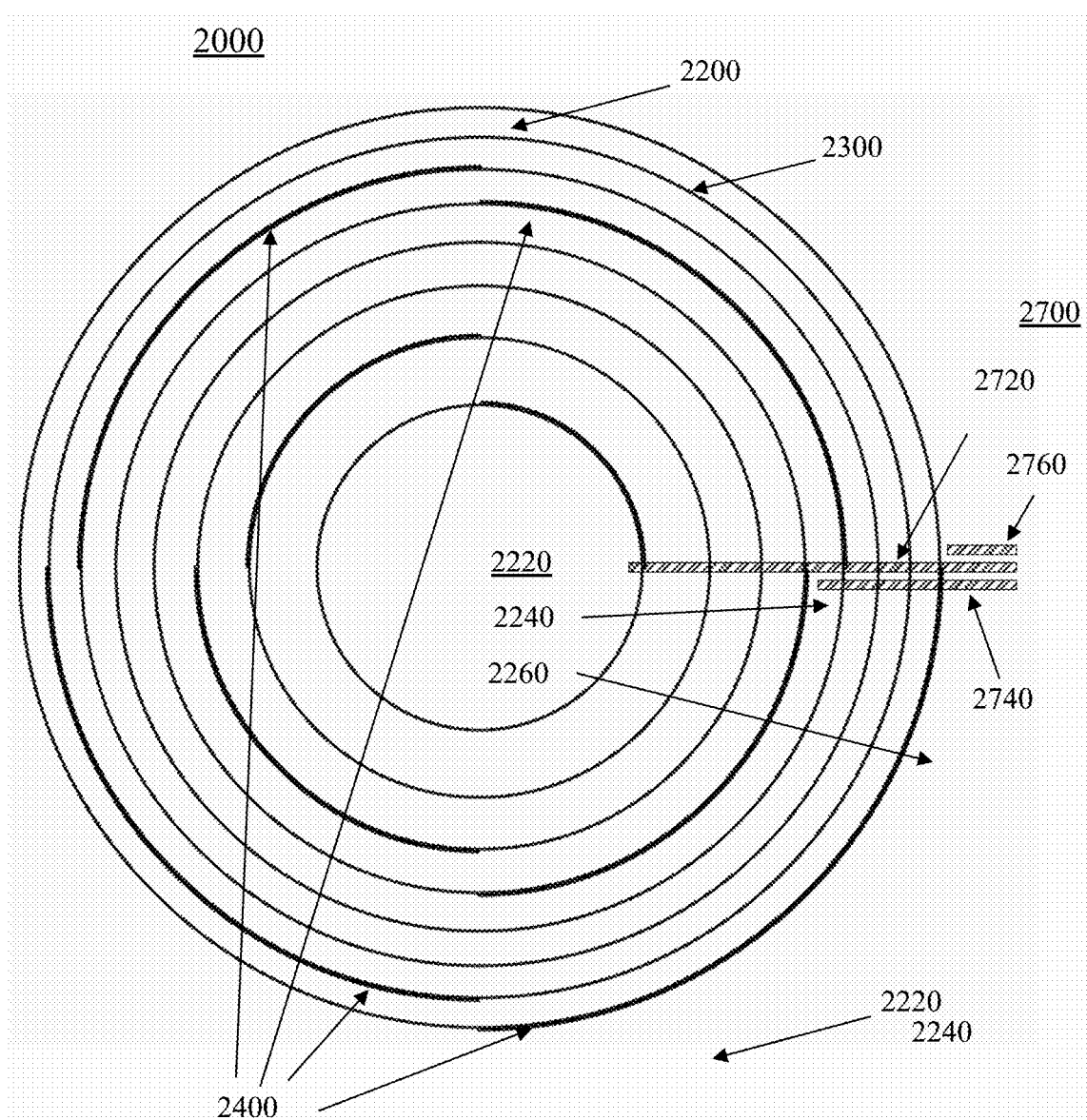
FIG. 2 is a view of an exemplary electro-active device 2000.

FIG. 2 is a view, looking in the Z direction, at an exemplary electro-active device 2000, and showing (what appear to be at this level of magnification) a plurality of ring-like electrodes 2200 that are substantially separated by (what appear to be at this level of magnification) a plurality of substantially ring-like non-conductive gaps 2300. Voltage supply connections 2700 are connected to certain ones of electrodes 2200. For example, voltage supply connections 2720, 2740, and 2760 are connected to electrodes 2220, 2240, and 2260, respectively.

In the exemplary embodiment illustrated in FIG. 2, resistive arcs 2400 are provided for a +1.00 diopter ("D") lens with ⅛ wave for OPD (i.e., "Optical Path Difference" and/or phase retardation) per electrode. In this example, resistive arcs 2400 are configured for a pitch of a quarter of a rotation. In this instance, there are four resistive arcs 2400 between each input 2700, and therefore inputs 2700 are substantially parallel to each other. The design is not restricted by this condition, and arcs 2400 can span any specified length from 1 micron to 10 cm, or when described as an angular size, from 1 degree to a whole rotation or more, including any and every particular value and/or sub-range therebetween (such as approximately: 5 degrees; 15 degrees; 90 degrees; 180 degrees; 360 degrees, and 720 degrees, etc.). Note that the number of inputs 2700 can be from 2 to several hundred or more, including every value therebetween (e.g., 4, 12, 24, 50, 100, etc.) To avoid electrical shorts, an insulating layer can be provided between the electrode layer and the inputs, with a given input connecting to its electrode through a hole or via in the insulating layer.

Figure 3:
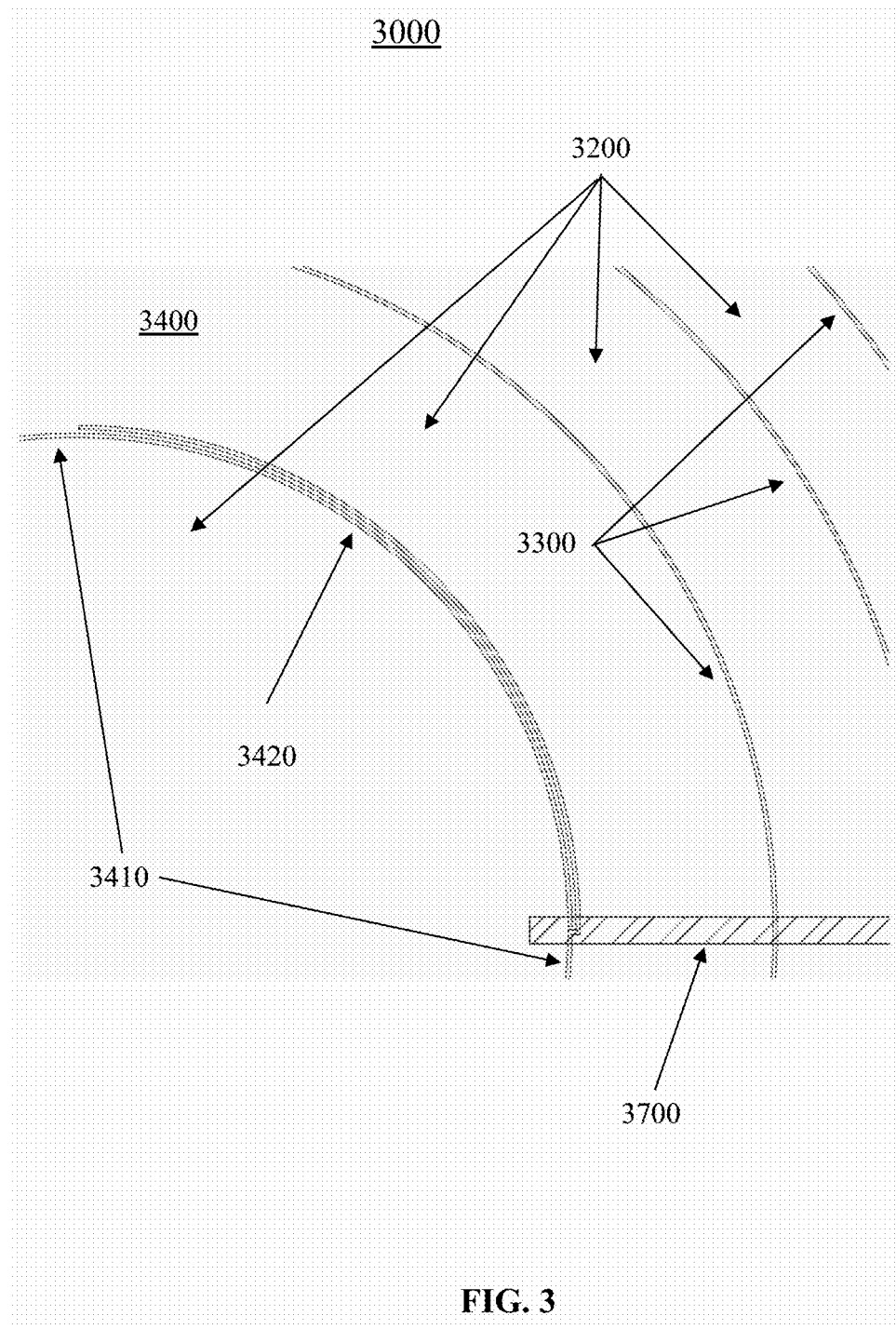
FIG. 3 is a view of an exemplary electro-active device 3000.

FIG. 3 is a view, looking in the Z direction, at an exemplary electro-active device 3000, and showing (what appear to be at this level of magnification) a plurality of ring-like electrodes 3200 that are substantially separated by (what appear to be at this level of magnification) a plurality of substantially ring-like non-conductive gaps 3300. In addition, FIG. 3 illustrates a voltage supply connection 3700 and a spiralesque gap 3400 that has a non-overlapping portion 3410 (partially visible in this view) and an overlapping portion 3420.

Figure 4:
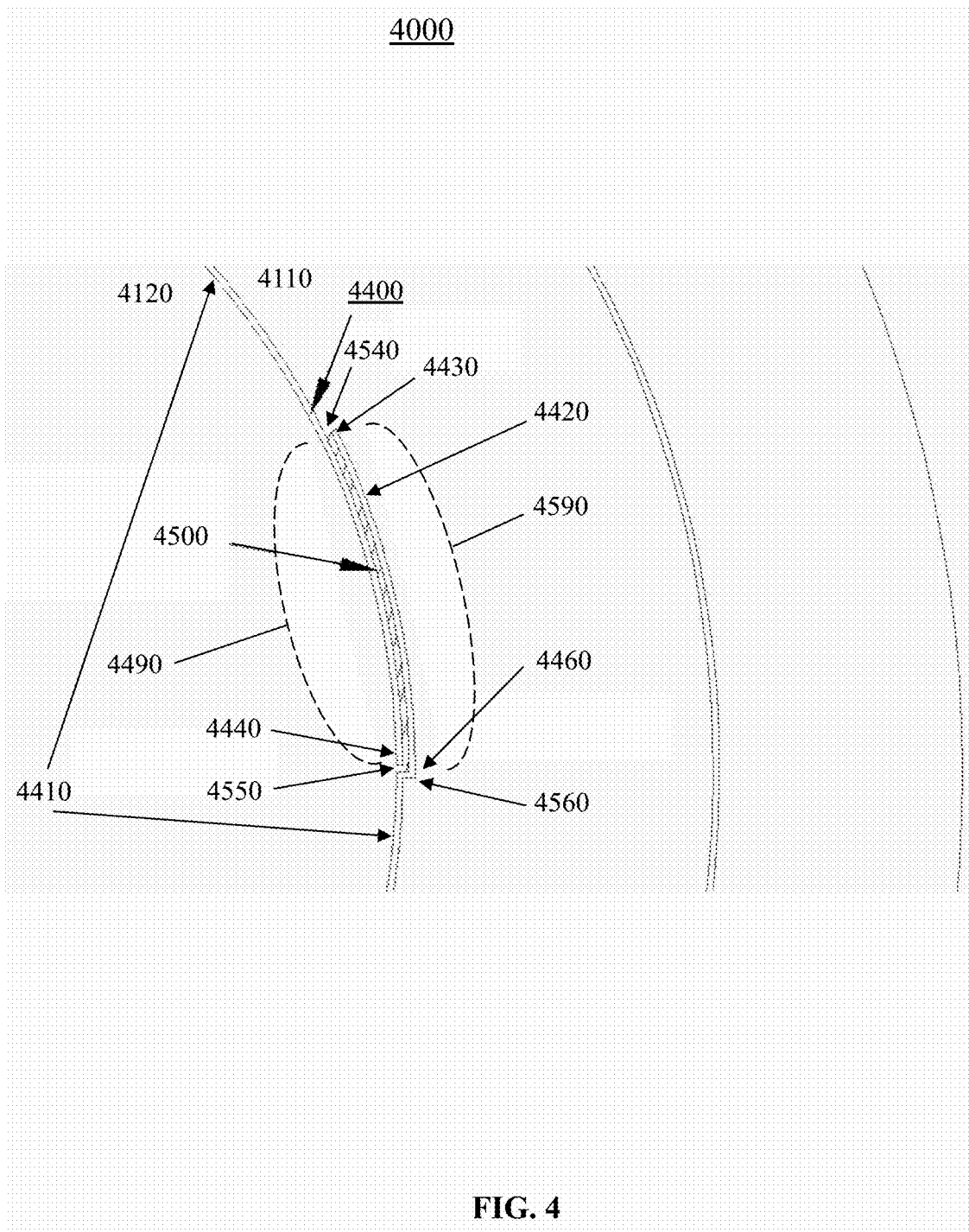
FIG. 4 is a view of an exemplary electro-active device 4000.

Providing a closer look at an exemplary spiralesque gap, FIG. 4 is a view, looking along the Z axis, of an exemplary electro-active device 4000. Electrically conductive and/or resistive neighboring electrodes 4110 and 4120 are substantially separated by gap 4400, which defines a single-gap non-overlapping portion 4410 and a dual-gap overlapping portion 4420. Gap 4400 can be visualized as starting at beginning terminus 4430 and finishing at ending terminus 4440, and having an abrupt change in radius at location 4450. Overlapping portion 4420 defines a (curved) overlap length 4490. Between the dual gaps of overlapping portion 4420 is a spiralesque arc 4500 having a (curved) arc length 4590. Arc 4500 can be formed from the same material as neighboring electrodes 4110 and 4120, and thus can provide a conductive and/or resistive link between those electrodes that can allow a current to flow from electrode 4110, through arc entry 4540, along the length 4590 of arc 4500, around arc corner 4560, and out arc exit 4550 to electrode 4120 and/or in the reverse direction. The longer the curved length 4490, the longer arc length 4590, and thus the larger the electrical resistance provided by spiralesque arc 4500. Likewise, the closer the dual gaps of overlapping portion 4420, the narrower arc 4500, and the larger the electrical resistance provided by spiralesque arc 4500. Note that the change in radius of gap 4400 as it transitions from non-overlapping portion 4410 to overlapping portion 4420 can be abrupt, as shown at gap corner 4460, or more gradual, potentially occurring over any desired part (and up to the entire length) of non-overlapping portion 4410. Likewise, arc 4500 can have a substantially constant radius and/or can have disruptions and/or discontinuities, such as shown at arc corner 4560.

Figure 5:
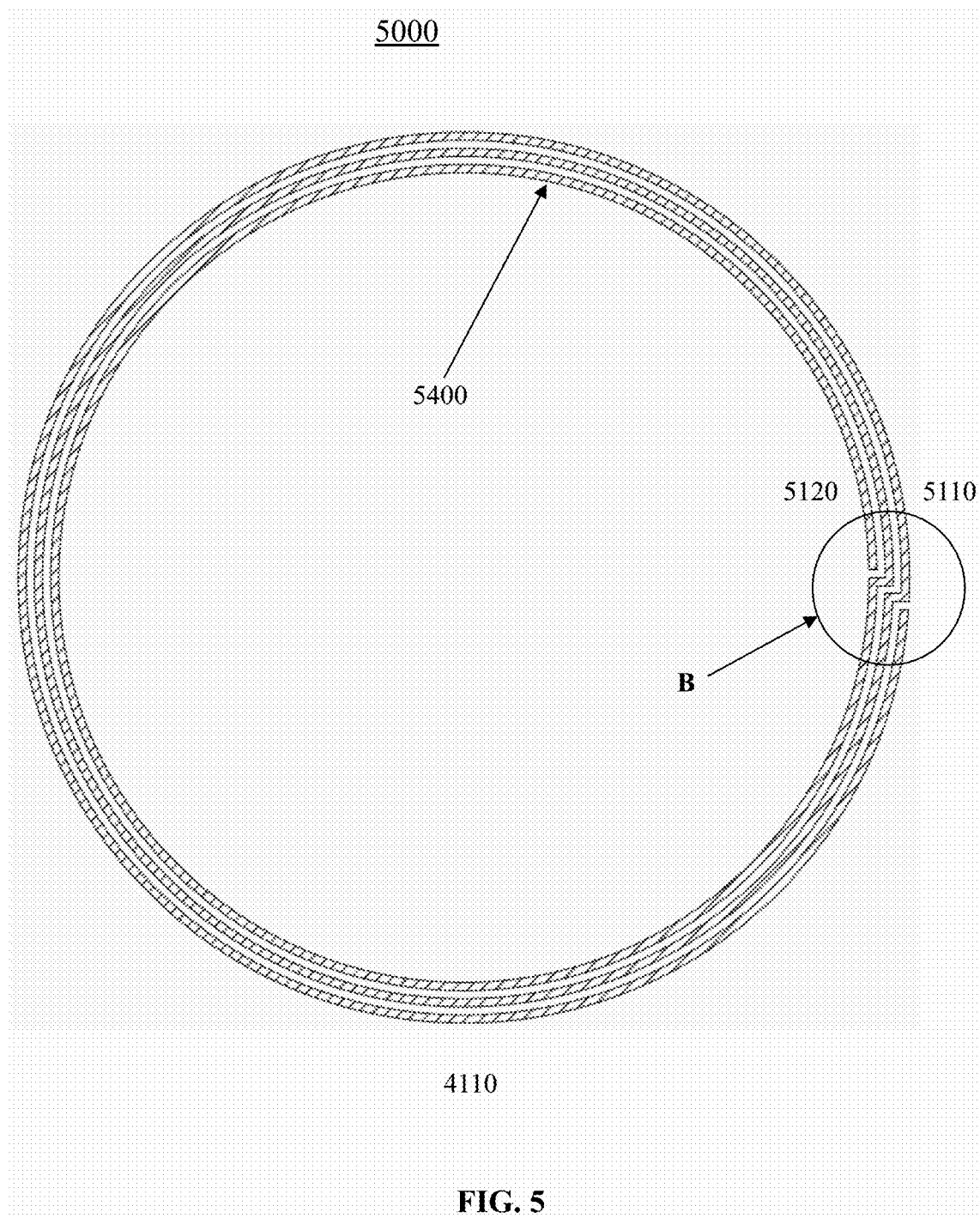
FIG. 5 is a view of an exemplary electro-active device 5000.

FIG. 5 is a view, looking in the Z direction, at an exemplary electro-active device 5000, and showing (what appear to be at this level of magnification) a plurality of electrodes 5110 and 5120 that are substantially separated by (what appear to be at this level of magnification) a spiralesque gap 5400 having an overlapping portion that spans several revolutions.

Figure 6:
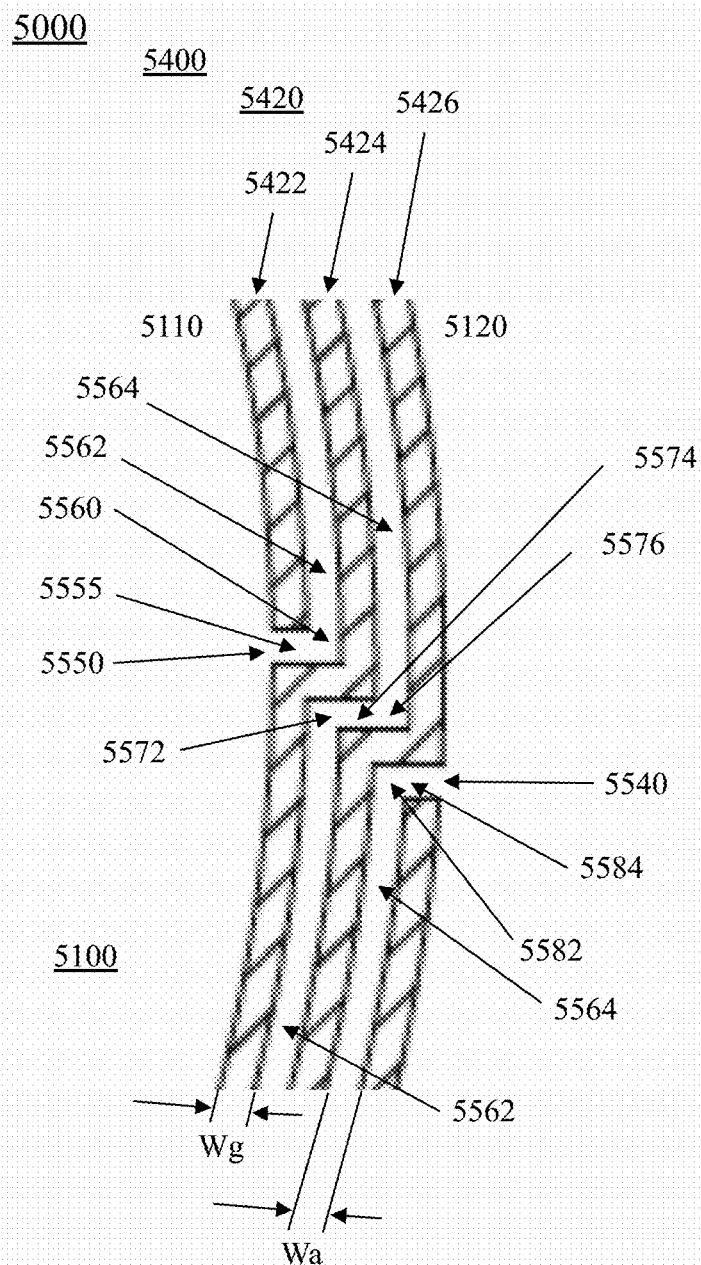
FIG. 6 is a view of an exemplary electro-active device 5000.

FIG. 6 is a zoomed view of zone B of FIG. 5, and showing exemplary electro-active device 5000, which comprises neighboring electrodes 5110 and 5120 that are substantially separated by a spiralesque gap 5400 having an overlapping 5420 portion that spans several revolutions, and thus appears to comprise three gap rings 5422, 5424, and 5426. The geometry of overlapping portion 5420 of gap 5400 substantially defines the geometry of spiralesque arc 5500, at least in the X-Y plane. The geometry of spiralesque arc 5500 in the Z direction can be controlled by the depth of electrode layer 5100. In this example, given the geometry of spiralesque arc 5500, current can flow from electrode 5110, through arc entrance 5550, along first radial portion 5555, around first corner 5560, along first arc portion 5562, around second corner 5572, along second radial portion 5574, around third corner 5576, along second arc portion 5564, around fourth corner 5582, along third radial portion 5584, and out arc exit 5540 to electrode 5120. Note that gap width Wg can be constant or can vary along gap 5400. Likewise, arc width Wa can be constant or vary along arc 5500.

Figure 7:
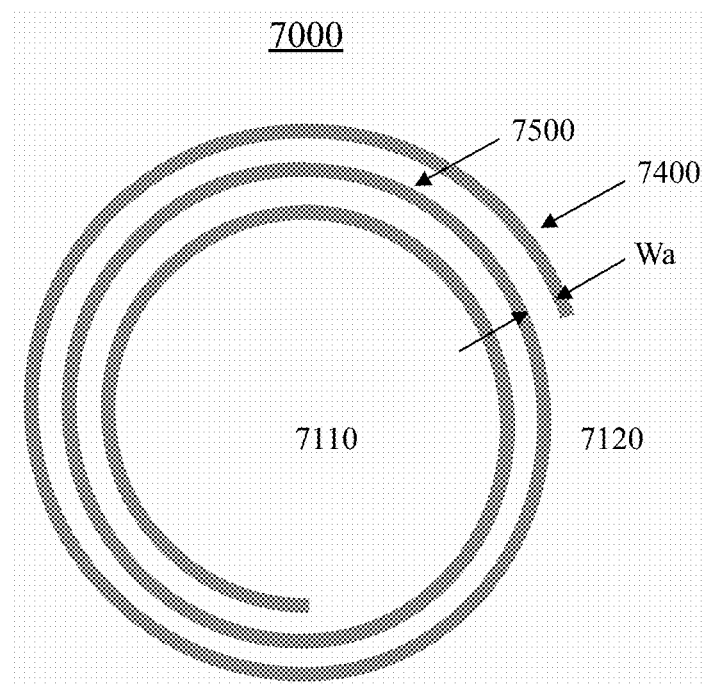
FIG. 7 is a view of an exemplary electro-active device 7000.
Figure 8:
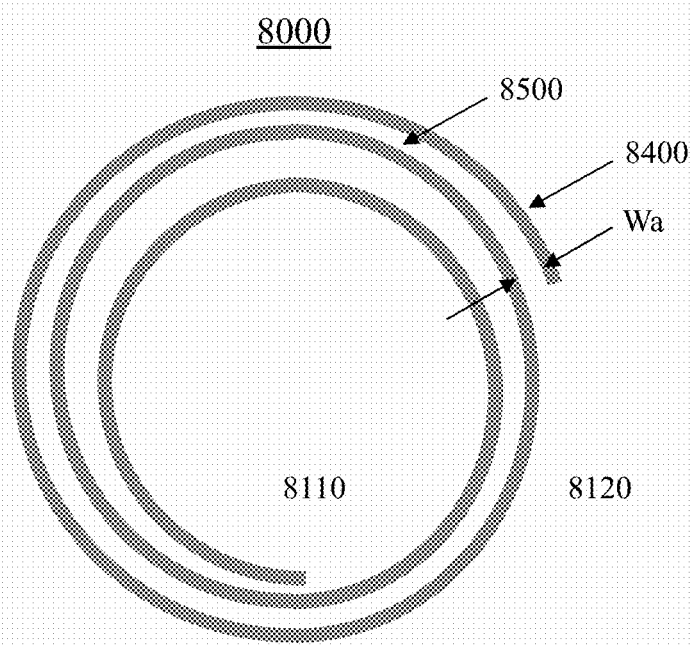
FIG. 8 is a view of an exemplary electro-active device 8000.

For example, FIG. 7 is a view, looking in the Z direction, of an exemplary electro-active device 7000. Electrically conductive and/or resistive neighboring electrodes 7110 and 7120 are substantially separated by spiralesque gap 7400, which defines a substantially constant arc width Wa at each location along spiralesque arc 7500. In contrast, in FIG. 8, which is a view, looking in the Z direction, of an exemplary electro-active device 8000 that has electrically conductive and/or resistive neighboring electrodes 8110 and 8120 are substantially separated by spiralesque gap 8400. In this exemplary embodiment, arc width Wa varies at various locations along spiralesque arc 8500.

Figure 9:
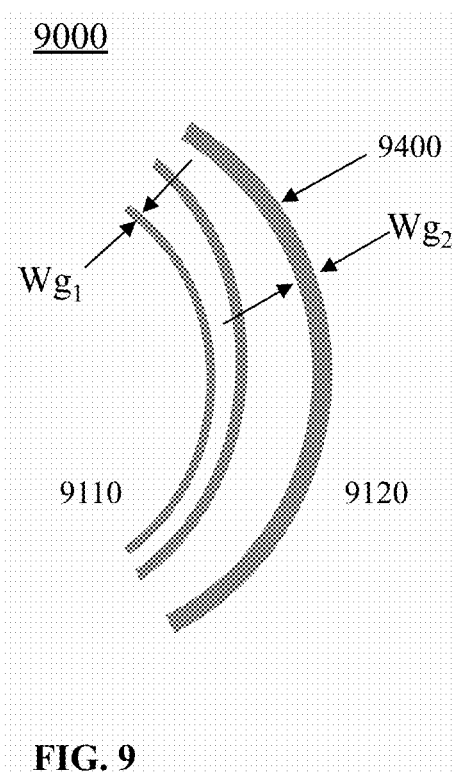
FIG. 9 is a view of an exemplary electro-active device 9000.

FIG. 9 is a view, looking in the Z direction, of a portion of an exemplary electro-active device 9000. Electrically conductive and/or resistive neighboring electrodes 9110 and 9120 are substantially separated by spiralesque gap 9400, which varies in width from a relatively thin width Wg1 in the innermost revolution of gap 9400 to a relatively wide width Wg2 in the outermost revolution of gap 9400.

Thus generally, multiple spiralesque resistive arcs, each having a different average radius, can be "stacked" together, e.g., connected by a short length of the same resistive arc material that is oriented at nearly any desired rotational angle, can produce spiralesque resistive arcs of multiple rotations around the electrode, ranging from a single rotation to two rotations, to even 10 or more rotations, including every value and sub-range therebetween.

Such spiralesque resistive arcs can have a considerable length. In general, everything else being equal, the greater the length of a spiralesque resistive arc, for a given arc width, the higher its effective resistance. In other words, a high ratio of length to width produces a higher resistance.

In the case of certain exemplary spiralesque resistive arcs comprising a single rotation about the inner radius of the electrode, the limiting factor of their length is the circumference of the electrode, which can be several orders of magnitude larger than the width of the arc (that is, the co-planar dimension that is perpendicular to the length and/or direction of the arc at any given point along the arc). This length can be further increased by the facilitation of resistive arcs consisting of subsequent further rotations (and/or a partial rotation) around the inner radius of the electrode, whereby the maximum length is defined by both the number of rotations, which is restricted by the width of the electrode, and the circumference of the electrode.

An exemplary feature size of a gap between electrodes can be approximately 1.5 microns, yet the range of gap and/or resistive arc widths can be between 0.1 microns to 10 microns, including any and every value and sub-range therebetween (such as 0.242, 0.50, 0.7673, 1.0, 1.22, and 1.43 microns). The electrodes, gaps, and/or resistive arcs can be formed via, for example, lithography, etching, printing (e.g., of conductive polymers), self-assembly, lift-off, laser ablation, and/or any other method of thin film patterning. When lithography is used, it can involve proximity lithography, contact lithography, projection lithography, interference lithography, maskless lithography, electron-beam lithography, and/or another other lithographic techniques. When etching is used, it can involve wet (liquid based) etching and/or dry (plasma based) etching.

In some embodiments, the resistance of each arc can be equal between each electrode connected. In this case, an alternative method of selecting the length of the resistive arcs can ensure that the length of each arc connection is consistent, rather than preserving angular size (e.g., in contrast to the example shown in FIG. 2, where a 90-degree segment is used for each connection). Instead, an arc of uniform length can be used for each resistive arc to ensure that the resistance is uniform between each electrode.

The spiralesque nature of a spiralesque resistive arc can minimize the distortion to the wavefront by the electroactive device. The voltage in a spiralesque resistive arc region along the length (direction of travel) of the arc can vary between the voltage of the two connected electrodes. Therefore, the refractive index in the arc region can vary between the refractive index of each of the two electrode regions being connected by the arc, and hence can cause minimal disruption to the wavefront profile. The etched regions of the conductive material forming the arc can experience fringing fields from the electrodes and/or the resistive arc, which can minimize disruption.

Figure 10:
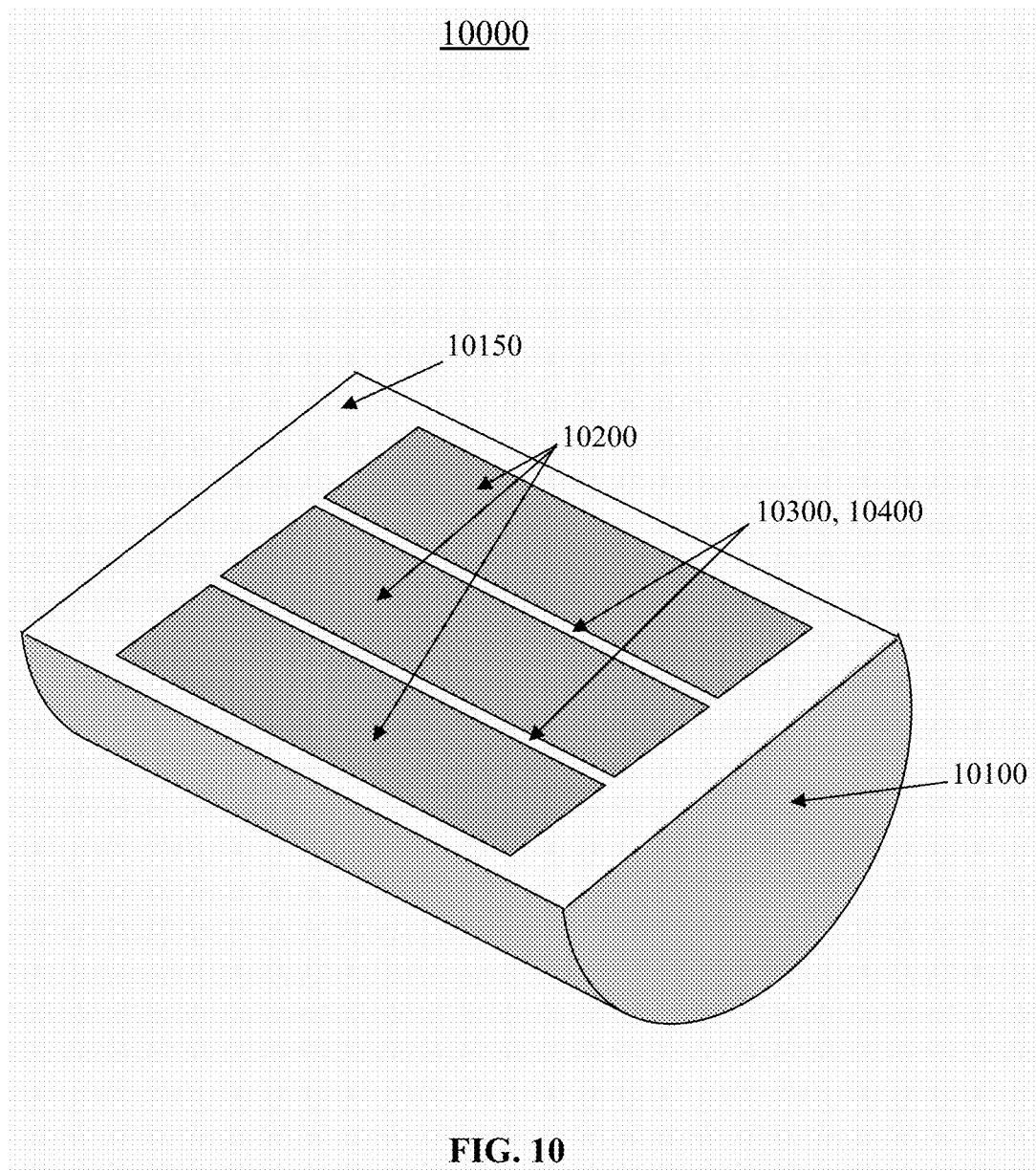
FIG. 10 is a view of an exemplary electro-active device 10000.

FIG. 10 is a perspective view of an exemplary electroactive device 10000, which can comprise a cylindrical lens 10100, a lens surface 10150, and/or a plurality of substantially rectangular electrodes 10200 that are separated by substantially rectangular gaps (and/or insulators) 10300. Over and/or within any given gap 10300 can be a substantially rectangular and/or linear resistive link 10400.

Figure 11:
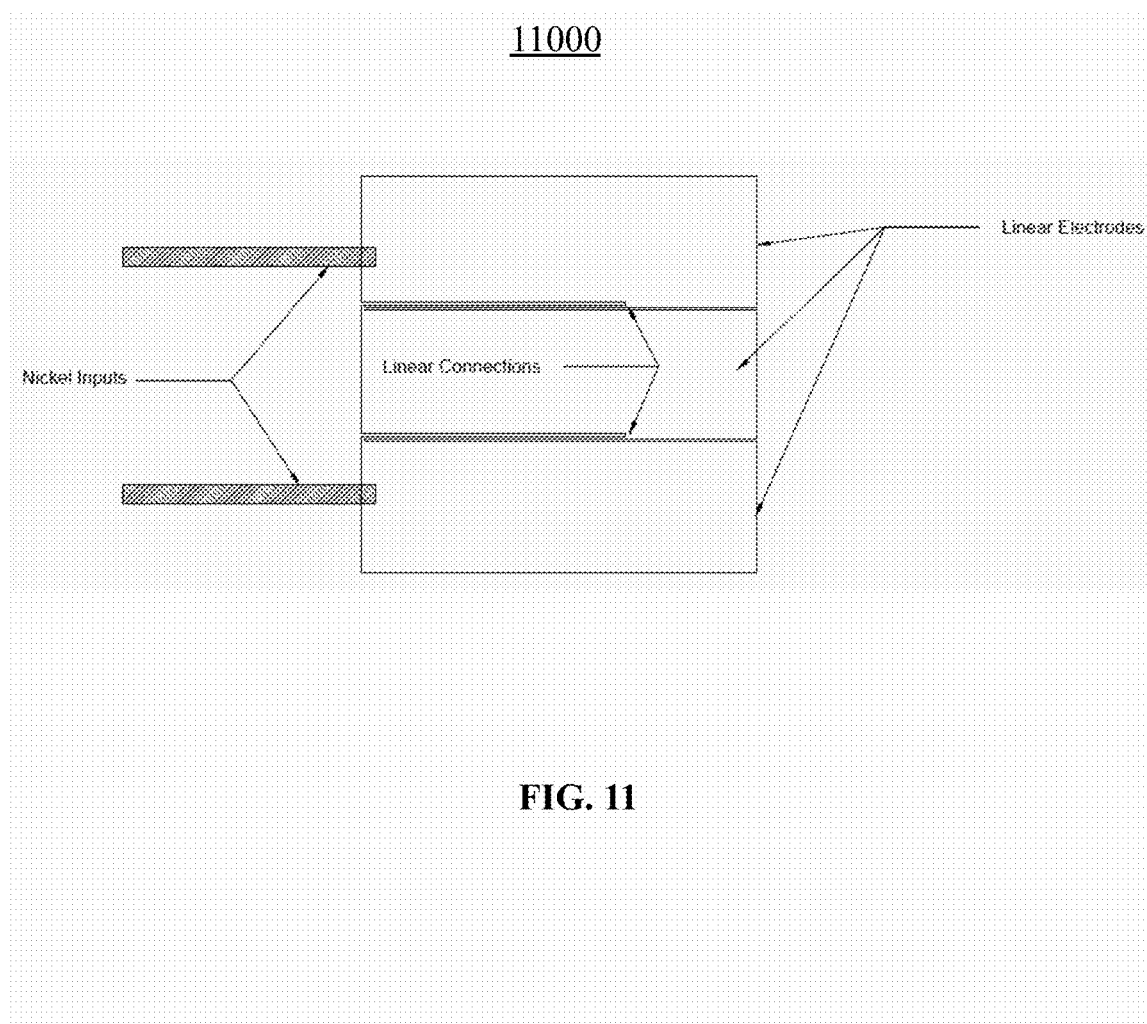
FIG. 11 is a view of an exemplary electro-active device 11000.

FIG. 11 is a view an exemplary electro-active device 11000. In this case the electrodes are straight rectangles, and are used to form a cylindrical lens with linear electrodes. In a similar manner to the main design, several electrodes are connected together with resistive connectors to reduce the number on inputs. It is fabricated using the same method as the concentric ring electrodes (i.e. lithography and etching etc.). In this case, the long resistive connections are not orientated axially, as there isn't a circular geometry, but the bridges are orientated parallel to the linear electrodes, so there is more space for them compared to if they were connected perpendicular to the electrodes. The thing that links this to the spiralesque bridges, is that in both instances, the resistive connections are parallel to the gap between two electrodes, which allows a far greater length to be used for the connections, which increases resistance, and improves optics.

Definitions

When the following phrases are used substantively herein, the accompanying definitions apply. These phrases and definitions are presented without prejudice, and, consistent with the application, the right to redefine these phrases via amendment during the prosecution of this application or any application claiming priority hereto is reserved. For the purpose of interpreting a claim of any patent that claims priority hereto, each definition in that patent functions as a clear and unambiguous disavowal of the subject matter outside of that definition.

a—at least one.

aberration—one or more limitations and/or defects in an optical component, such as a lens and/or mirror, that is contacted by a plurality of light rays, such limitations and/or defects preventing the light rays from converging at one focus and potentially due to, e.g., the optical component comprising one or more surfaces that are not perfectly planar, such as one or more spherical surfaces.

about—around and/or approximately.

above—at a higher level.

across—from one side to another.

activity—an action, act, step, and/or process or portion thereof.

adapt—to design, make, set up, arrange, shape, configure, and/or make suitable and/or fit for a specific purpose, function, use, and/or situation.

adapter—a device used to effect operative compatibility between different parts of one or more pieces of an apparatus or system.

adjacent—in close proximity to, near, next to, adjoining, neighboring, contiguous, and/or within a horizontal radius of approximately 0 mm to approximately 10 mm, including all values and subranges therebetween.

after—following in time and/or subsequent to.

align—to adjust substantially into a proper orientation and/or location with respect to another thing.

along—through, on, beside, over, in line with, and/or parallel to the length and/or direction of; and/or from one end to the other of.

amplitude—a magnitude of a variable.

and—in conjunction with.

and/or—either in conjunction with or in alternative to.

any—one, some, every, and/or all without specification.

apparatus—an appliance or device for a particular purpose.

applied—incident directly and/or indirectly upon.

apply—to put to, on, and/or into action and/or service; to implement; and/or to bring into contact with something.

approximately—about and/or nearly the same as.

arc—something shaped like a curve or arch and/or a segment of a circle, oval, or spiral.

arc length—the distance traveled along the full extent of an arc.

arc depth—the dimension of an arc measured perpendicular to the arc length and to the arc width at any given location along the arc.
arc width—the co-planar dimension of an arc measured perpendicular to the arc length at any given location along the arc.
are—to exist.
around—about, surrounding, and/or on substantially all sides of; and/or approximately.
as long as—if and/or since.
associate—to join, connect together, and/or relate.
at—in, on, and/or near.
at least—not less than, and possibly more than.
axis—a straight line about which a body and/or geometric object rotates and/or can be conceived to rotate and/or a center line to which parts of a structure and/or body can be referred.
based on—indicating one or more factors that affect a determination, but not necessarily foreclosing additional factors that might affect that determination.
be—to exist in actuality.
beam of light—a projection of light radiating from a source.
being—is and/or the state or quality of having existence.
between—in a separating interval and/or intermediate to.
border—to be located and/or positioned adjacent to an outer edge, surface, and/or extent of an object.
bound—(n) a boundary, limit, and/or further extent of; (v) to limit an extent.
by—via and/or with the use and/or help of
can—is capable of, in at least some embodiments.
cause—to bring about, provoke, precipitate, produce, elicit, be the reason for, result in, and/or effect.
circuit—a physical system comprising, depending on context: an electrically conductive pathway, an information transmission mechanism, and/or a communications connection, the pathway, mechanism, and/or connection established via a switching device (such as a switch, relay, transistor, and/or logic gate, etc.); and/or an electrically conductive pathway, an information transmission mechanism, and/or a communications connection, the pathway, mechanism, and/or connection established across two or more switching devices comprised by a network and between corresponding end systems connected to, but not comprised by the network.
co-incident—occupying the same area in space, happening at the same time, and/or matching point for point.
co-planar—substantially sharing a common plane.
coil—(n) a continuous loop comprising two or more turns of electrically conductive material; and/or a conductor that creates a magnetic field due to the flow of current therein; (v) to roll and/or form into a configuration having a substantially spiraled cross-section.
complete—to provide required and/or requested information.
composition of matter—a combination, reaction product, compound, mixture, formulation, material, and/or composite formed by a human and/or automation from two or more substances and/or elements.
comprising—including but not limited to.
concave—a surface of an object such that for any pair of points on the surface, any point on the straight line segment that joins the pair of points is over or outside the object; and/or an object having major surfaces that curve inward, such as the inner surface of a sphere or circle.
concentric—having a common central axis.
conductor—an electrically conductive material and/or component adapted to apply a voltage to an electroactive material.
configure—to design, arrange, set up, shape, and/or make suitable and/or fit for a specific purpose, function, use, and/or situation.
configured to—designed, arranged, set up, shaped, and/or made suitable and/or fit for a specific purpose, function, use, and/or situation, and/or having a structure that, during operation, will perform the indicated activity(ies). To the extent relevant to the current application, the use of "configured to" is expressly not intended to invoke 35 U.S.C. § 112(f) for that structure.
connect—to join or fasten together.
connected—physically linked.
connection—a tangible link.
contact—to physically touch and/or come together.
containing—including but not limited to.
contiguous—neighboring and/or adjacent.
continuous—in a manner substantially uninterrupted in time, sequence, substance, and/or extent, and/or substantially without cessation.
control—(n) a mechanical or electronic device used to operate a machine within predetermined limits; (v) to exercise authoritative and/or dominating influence over, cause to act in a predetermined manner, direct, adjust to a requirement, and/or regulate.
convert—to transform, adapt, and/or change.
convex—an object having major surfaces that bulge and/or curve outward, such as the exterior surface of a sphere or circle.
cooperate—to work and/or act together toward a common end and/or purpose.
corresponding—related, associated, accompanying, similar in purpose and/or position, conforming in every respect, and/or equivalent and/or agreeing in amount, quantity, magnitude, quality, and/or degree.
coupleable—capable of being joined, connected, and/or linked together.
coupling—linking in some fashion.
cover—(n) a substantially planar object configured to protect and/or conceal; (v) to overlay, place upon and/or over.
create—to make, form, produce, generate, bring into being, and/or cause to exist.
dedicate—to commit and/or give entirely to a particular use, activity, cause, and/or entity.
define—to establish the meaning, relationship, outline, form, and/or structure of; and/or to precisely and/or distinctly describe and/or specify.
degree—a measure of arcs and plane angles and representing 1/360 of a full rotation.
deposit—to put, lay, place, position, and/or set down; and/or to fasten, fix, and/or secure.
derive—to receive, obtain, and/or produce from a source and/or origin.
determine—to find out, obtain, calculate, decide, deduce, ascertain, and/or come to a decision, typically by investigation, reasoning, and/or calculation.
device—a machine, manufacture, and/or collection thereof.
direction—a spatial relation between something and a course along which it points and/or moves; a distance independent relationship between two points in space that specifies the position of either with respect to the other; and/or a relationship by which the alignment and/or orientation of any position with respect to any other position is established.

diverge—to go or extend in different directions from a common point.

divide—to subject (a number) to the process of division.

each—every one of a group considered individually.

edge—a periphery, border, and/or boundary.

effective—sufficient to bring about, provoke, elicit, and/or cause.

electric—powered by electricity.

electrical—relating to producing, distributing, and/or operating by electricity.

electrical energy—energy characterized by, and/or adapted to cause, a flow of electric charge through a conductor.

electrically—of, relating to, producing, or operated by electricity.

electrically coupled—connected in a manner adapted to allow a flow of electricity therebetween.

electro-active—a branch of technology concerning the interaction between various properties and electrical and/or electronic states of materials and/or involving components, devices, systems, and/or processes that operate by modifying the certain properties of a material by applying to it an electrical and/or magnetic field. Sub-branches of this technology include, but are not limited to, electro-optics.

electro-active device—a device that integrates and/or utilizes an electro-active element, such as a pair of spectacles, pair of sunglasses, ophthalmic lens, monocle, corrective lens, contact lens, intra-ocular lens, inlay, onlay, retinal display, medical device, optical instrument (e.g., interferometer, photometer, polarimeter, reflectometer, refractometer, spectrometer, monochromator, autocollimator, vertometer, DNA sequencer, and/or surface plasmon resonance-based instrument), polarization controller, display, video display (e.g., CRT, LCD, LED, PDP, DLP, OLED, AMO-LED, OLET, SED, FED, quantum dot, IMOD, DMS, MEMS, FLCD, TDEL, TDP, and/or LPD display), non-video display, 3D display (e.g., swept-volume, vari-focal mirror, emissive volume, laser, holographic, and/or light field display), static display, electronic paper, augmented, virtual, and/or mixed reality display, head-mounted display, heads-up display, flat panel display, computer display, television display, laser TV, laser, laser scanner, laser pointer, lantern, flashlight, lamp, lightbulb, lighting, MEMS device, MOEMS device, micro-optics device, watch, smart watch, calculator, phone, smartphone, image sensor, still camera, video camera, webcam, non-visible light device (e.g., infrared, UV, and/or X-ray device, etc.), projector (e.g., slide, video, movie, cinema, and/or handheld projector), instrument panel, guidance system, security system, optical disc system, optical fiber system, sign, mirror, micromirror, trough, reflector, telescope, magnifier, periscope, microscope, eyepiece, a pair of binoculars, monocular, and/or lens (e.g., microlens, lenticular, refractive, diffractive, spherical, aspherical, holographic, achromatic, gradient index, axicon, super, flat, cylindrical, and/or Fresnel lens), prism, modulator (e.g., phase, frequency, amplitude, and/or polarization modulator), deflector, diode, transducer, sensor, actuator, and/or adaptive optic, etc.

electro-active element—a component that utilizes an electro-active effect, such as an electro-active filter, reflector, lens, shutter, liquid crystal retarder, active (i.e., non-passive) polarity filter, electro-active element that is movable via an electro-active actuator, and/or conventional lens movable by an electro-active actuator.

electro-optic—a branch of technology concerning the interaction between the electromagnetic (optical) and the electrical (electronic) states of materials and/or involving components, devices, systems, and/or processes that operate by modifying the optical properties of a material by applying to it an electrical field.

electrode—an electrically conducting element that emits and/or collects electrons and/or ions and/or controls their movement by means of an electric field applied to it.

emanate—to emit, radiate, and/or shine.

embodiment—an implementation, manifestation, and/or concrete representation.

energy—usable heat or power, and/or the capacity of a body and/or system to do work, and/or a measurable physical quantity, with dimensions equivalent and/or convertible to mass times velocity squared, that is conserved for an isolated system.

estimate—(n) a calculated value approximating an actual value; (v) to calculate and/or determine approximately and/or tentatively.

etch—to wear away the surface of material (such as a metal, glass, etc.) by chemical action, such as the action of an acid.

exemplary—serving as an example, instance, and/or illustration.

extend—to reach spatially outward and/or to move out and/or away from.

extending—existing, located, placed, and/or stretched lengthwise.

extension—an addition, portion, and/or element that increases the area, influence, operation, and/or contents of something.

external—relating to, existing on, and/or connected with the outside or an outer part; exterior.

eye—an organ of vision and/or light sensitivity; and/or either of a pair of hollow structures located in bony sockets of the skull, functioning together or independently, each having a lens capable of focusing incident light on an internal photosensitive retina from which nerve impulses are sent to the brain.

field—a region of space characterized by a physical property, such as gravitational or electromagnetic force or fluid pressure, having a determinable value at every point in the region.

first—a label for a referenced element in one or more patent claims, but that label does not necessarily imply any type of ordering to how that element (or any other elements of a similar type) is implemented in embodiments of the claimed subject matter.

flat—having a substantially planar major face, a smooth even surface, substantially no projections and/or depressions, and/or a relatively broad level surface in relation to thickness or depth.

for—with a purpose of form—(v) to construct, build, generate, and/or create; (n) a phase, structure, and/or appearance.

from—used to indicate a source, origin, and/or location thereof.

further—in addition.

gap—an electrical discontinuity and/or interruption in continuity, such as a space (area, volume, filled with air and/or a substantially electrically insulating material, and/or a space not containing an electrically conducting material, and/or a space between objects, and/or a break, opening, cleft, gulf, rift, space, recess, interval, and/or difference between two items and/or objects.
generate—to create, produce, give rise to, and/or bring into existence; and/or to produce electrical power.
given—specified and/or fixed.
gradient—a rate of change with respect to distance of a variable quantity.
having—including but not limited to.
illuminate—to provide and/or brighten with light.
impinge—to collide and/or strike.
including—including but not limited to.
index of refraction—a measure of the extent to which a substance slows down light waves passing through it. The index of refraction of a substance is equal to the ratio of the velocity of light in a vacuum to its speed in that substance. Its value determines the extent to which light is refracted when entering or leaving the substance.
indium tin oxide—a solid solution of indium(III) oxide (In2O3) and tin(IV) oxide (SnO2), typically 90% In2O3, 10% SnO2 by weight, that is typically transparent and colorless in thin layers and can serve as a metal-like mirror in the infrared region of the electromagnetic spectrum. It is a widely used transparent conducting oxide due to its electrical conductivity and optical transparency. Thin films of indium tin oxide are most commonly deposited on surfaces by electron beam evaporation, physical vapor deposition, and/or a range of sputter deposition techniques.
individually—of or relating to a distinct entity.
initialize—to prepare something for use and/or some future event.
input—a conductor linked to a voltage source.
install—to connect or set in position and prepare for use.
insulate—to resist heat flow and/or current flow.
insulating—having a substantial resistance to the flow of electrical current.
into—to a condition, state, or form of
is—to exist in actuality.
lack—a particular deficiency and/or absence.
layer—a continuous and relatively thin material, region, stratum, course, lamina, coating, and/or sheet having one or more functions. Need not have a constant thickness.
length—a longest dimension of something and/or the measurement of the extent of something along its greatest dimension.
lens—a piece of transparent substance, often glass and/or plastic, having two opposite surfaces either both curved or one curved and one plane, used in an optical device for changing the convergence and/or focal point of light rays; an optical device for changing the convergence and/or focal point of light rays; and/or an optical device that transmits light, refracts light, and/or is adapted to cause the light to concentrate and/or diverge. A lens can be an ophthalmic lens, such as a spectacle lens, an intra ocular lens, and/or a contact lens.
lenslet—one of several lenses forming a substantially planar array.
less than—having a measurably smaller magnitude and/or degree as compared to something else.
light—electromagnetic radiation having a wavelength within a range of approximately 300 nanometers to approximately 1000 nanometers, including any and all values and subranges therebetween, such as from approximately 400 to approximately 700 nm, from the near infrared through the long wavelength, far infrared, and/or from the ultraviolet to X-rays and/or gamma rays.
light source—a device adapted to emit light responsive to an applied electrical current.
line—an electrical conductor and/or a geometric figure formed by a point moving along a fixed direction and the reverse direction.
liquid—a body of matter that exhibits a characteristic readiness to flow, little or no tendency to disperse, and relatively high incompressibility, including pumpable and/or flowable slurries and/or suspensions.
liquid crystal—any of various liquids in which the atoms or molecules are regularly arrayed in either one dimension or two dimensions, the order giving rise to optical properties, such as anisotropic scattering, associated with the crystals.
locate—to place, set, find, and/or situate in a particular spot, region, and/or position.
longitudinal—of and/or relating to a length; placed and/or running lengthwise.
longitudinal axis—a straight line defined parallel to an object's length and passing through a centroid of the object.
match—to mirror, resemble, harmonize, fit, correspond, and/or determine a correspondence between, two or more values, entities, and/or groups of entities.
material—a substance and/or composition.
may—is allowed and/or permitted to, in at least some embodiments.
method—one or more acts that are performed upon subject matter to be transformed to a different state or thing and/or are tied to a particular apparatus, said one or more acts not a fundamental principal and not pre-empting all uses of a fundamental principal.
micron—A unit of length equal to a thousandth part of a millimeter or a millionth of a meter.
mm—millimeter.
more—a quantifier meaning greater in size, amount, extent, and/or degree.
near—a distance of less than approximately [X].
no—an absence of and/or lacking any.
non-destructively—to perform substantially without damaging.
non-overlapping—not extending over or covering a part of
not—a negation of something and/or in no way.
offset—in a location near to but distinguishable from a given point or area.
one—being and/or amounting to a single unit, individual, and/or entire thing, item, and/or object.
operable—practicable and/or fit, ready, and/or configured to be put into its intended use and/or service.
operative—when in operation for its intended use and/or service.
operatively—in a manner able to function and/or to work.
ophthalmic—of and/or relating to the eye.
opposing—opposite; against; being the other of two complementary or mutually exclusive things; placed or located opposite, in contrast, in counterbalance, and/or across from something else and/or from each other.
opposite—facing away from.
optical—of or relating to light, sight, and/or a visual representation.

optically edge-less—substantially lacking an ability to bend light due to interaction of the light with a discontinuity and/or edge.
or—a conjunction used to indicate alternatives, typically appearing only before the last item in a group of alternative items.
outside—beyond a range, boundary, and/or limit; and/or not within.
overlap—to extend over and/or cover a part of.
pair—a set of two items.
parallel—of, relating to, and/or designating lines, curves, planes, and/or surfaces everywhere equidistant and/or an arrangement of components in an electrical circuit that splits an electrical current into two or more paths.
path—a route along which current can flow.
pattern—a characteristic form.
per—for each and/or by means of.
perceptible—capable of being perceived by the human senses.
perpendicular—intersecting at or forming substantially right angles; and/or substantially at a right angle with respect to an axis.
phase—a relationship in time between successive states and/or cycles of an oscillating and/or repeating system (such as an alternating electric current, one or more light waves, and/or a sound wave) and: a fixed reference point; the states of another system; and/or the cycles of another system.
photolithography—a process whereby metallic foils, fluidic circuits, and/or printed circuits can be created by exposing a photosensitive substrate to a pattern, such as a predesigned structural pattern and/or a circuit pattern, and chemically etching away either the exposed or unexposed portion of the substrate.
photon—a particle representing a quantum of light and/or other electromagnetic radiation, the particle having zero rest mass and carrying energy proportional to the frequency of the radiation.
physical—tangible, real, and/or actual.
physically—existing, happening, occurring, acting, and/or operating in a manner that is tangible, real, and/or actual.
planar—shaped as a substantially flat two-dimensional surface.
plurality—the state of being plural and/or more than one.
pocket—a container that at least partially encloses its contents.
point—(n.) a defined physical and/or logical location in at least a two-dimensional system and/or an element in a geometrically described set and/or a measurement or representation of a measurement having a time coordinate and a non-time coordinate. (v.) to indicate a position and/or direction of.
portion—a part, component, section, percentage, ratio, and/or quantity that is less than a larger whole. Can be visually, physically, and/or virtually distinguishable and/or non-distinguishable.
position—to put in place or position.
power—energy, a measure of energy and/or work, and/or a rate at which work is done, expressed as the amount of work per unit time and commonly measured in units such as watt and horsepower and/or a measure of an ability of a vision system, eye, lens, and/or lens-assisted eye, to refract, magnify, separate, converge, and/or diverge; and/or a general term that may refer to any power such as effective, equivalent, dioptric, focal, refractive, surface, and/or vergence power.
power supply—a source of electrical power.
pre-—a prefix that precedes an activity that has occurred beforehand and/or in advance.
predetermine—to determine, decide, and/or establish in advance.
prevent—to hinder, avert, and/or keep from occurring.
prior—before and/or preceding in time or order.
probability—a quantitative representation of a likelihood of an occurrence.
product—something produced by human and/or mechanical effort.
project—to calculate, estimate, or predict.
proportional—having a ratio that is approximately constant.
provide—to furnish, supply, give, convey, send, and/or make available.
radial—pertaining to that which radiates from and/or converges to a common center and/or has or is characterized by parts so arranged or so radiating.
radially—in a manner that radiates from and/or converges to a common center, having or characterized by parts so arranged or so radiating, and/or moving and/or directed along a radius.
range—a measure of an extent of a set of values and/or an amount and/or extent of variation.
ratio—a relationship between two quantities expressed as a quotient of one divided by the other.
receive—to get as a signal, take, acquire, and/or obtain.
recommend—to suggest, praise, commend, and/or endorse.
reduce—to make and/or become lesser and/or smaller.
remove—to eliminate, remove, and/or delete, and/or to move from a place or position occupied.
repeat—to do again and/or perform again.
repeatedly—again and again; repetitively.
request—to express a desire for and/or ask for.
resistance—a measure of a voltage drop across a resistor, typically having units of Ohms.
resistive divider network—a group of resistive entities that are electrically connected in a manner that each provides a corresponding voltage drop when supplied with electrical current.
resistor—a two-terminal electronic component that opposes an electric current by producing a voltage drop between the two terminals in accordance with Ohm's law.
result—(n.) an outcome and/or consequence of a particular action, operation, and/or course; (v.) to cause an outcome and/or consequence of a particular action, operation, and/or course.
revolution—a turning or rotational motion about an axis and/or a single complete cycle of such orbital or axial motion.
ring—a substantially toroidal object that can be imagined as having been generated by rotating a closed loop (e.g., ellipse, circle, irregular curve, polygon, etc.) about a fixed line external to the loop.
rotational—about and/or around an axis.
said—when used in a system or device claim, an article indicating a subsequent claim term that has been previously introduced.
second—a label for an element in one or more patent claims, the element other than a "first" referenced element of a similar type, but the label does not necessarily imply any type of ordering to how that "second" element or the "first" element is implemented in embodiments of the claimed subject matter.

select—to make a choice or selection from alternatives.
separate—(n) distinct; (v) to disunite, space, set, or keep apart and/or to be positioned intermediate to.
separated—not touching and/or spaced apart by something.
set—a related plurality of predetermined elements; and/or one or more distinct items and/or entities having a specific common property or properties.
silicon dioxide—a.k.a., "silica"; a white or colorless vitreous insoluble solid (SiO2); various forms occur widely in the earth's crust as e.g., quartz, cristobalite, tridymite, lechatelierite, etc.
solid angle—a three-dimensional angle, formed by three or more planes intersecting at a common point. Its magnitude is measured in steradians, a unitless measure. The corner of a room forms a solid angle, as does the apex of a cone; one can imagine an indefinite number of planes forming the smooth round surface of the cone all intersecting at the apex. Solid angles are commonly used in photometry.
span—to extend across in space or time.
species—a class of individuals and/or objects grouped by virtue of their common attributes and assigned a common name; a division subordinate to a genus.
spherical—of, relating to, and/or having a shape approximating that of a sphere.
spherical lens—a lens whose surfaces form portions of spheres.
spiral—a path of a point in a plane moving around a central point while, on average, receding from or approaching it. When considering a spiral that generally recedes from the central point, for a given rotation about the central point, the spiral need not have a continuously increasing radius from the central point, however, each successive turn will have an increasing radius. Thus, a portion of a spiral can be linear and/or curvilinear.
spiralesque—any of a family of substantially two-dimensional shapes, each member of that family having from some to complete resemblance to a true and substantially two-dimensional geometric spiral, yet a given member need not emerge from a center point (e.g., can begin at an endpoint of a predetermined radius from that center point), need not have an infinite length (e.g., can resemble a portion of such a shape), need not continuously change in radius along its length (e.g., at some point along its length can experience a step or steep change in radius, followed by a constant and/or unchanging radius, potentially followed by another step or steep change in radius, etc.), need not be formed from a continuous curve (e.g., can be formed from any number of line segments), need not have a constant width (e.g., can have a changing and/or variable width from one rotation to the next and/or one point to another along the shape), and/or need not have a constant depth (i.e., in the third and/or Z dimension) (e.g., can have a changing and/or variable depth or thickness along its length).
store—to place, hold, and/or retain data, typically in a memory.
strip—a relatively long piece, usually of substantially uniform width.
structure—that which is complexly constructed, a manner in which components are organized and/or form a whole, and/or a device.
substantially—to a great extent and/or degree.
substrate—an underlying material, region, base, stratum, course, lamina, coating, and/or sheet.
sufficiently—to a degree necessary to achieve a predetermined result.
support—to bear the weight of, especially from below.
surface—the outer boundary of an object and/or a material layer constituting and/or resembling such a boundary.
switch—(v) to: form, open, and/or close one or more circuits; form, complete, and/or break an electrical and/or informational path; select a path and/or circuit from a plurality of available paths and/or circuits; and/or establish a connection between disparate transmission path segments in a network (or between networks); (n) a physical device, such as a mechanical, electrical, and/or electronic device, that is adapted to switch.
system—a collection of mechanisms, devices, machines, articles of manufacture, processes, data, and/or instructions, the collection designed to perform one or more specific functions.
terminating—ending.
that—used as the subject or object of a relative clause.
thereto—to that.
through—across, among, between, and/or in one side and out the opposite and/or another side of
to—a preposition adapted for use for expressing purpose.
transform—to change in measurable: form, appearance, nature, and/or character.
transmit—to send as a signal, provide, furnish, and/or supply.
transparent—clear; characterized by conveying incident light without reflecting or absorbing a substantial portion of that light; and/or having the property of transmitting rays of light through its substance so that bodies situated beyond or behind can be distinctly seen.
treatment—an act, manner, or method of handling and/or dealing with someone and/or something.
tunable—adjustable or adaptable to meet specific requirements and/or conditions.
two—a cardinal number equal to one plus one.
unique—existing as the only one, having no equal, and/or distinctive in some attribute.
unique—separate and distinct.
upon—immediately or very soon after; and/or on the occasion of.
use—to put into service.
variable—(n) a property, parameter, and/or characteristic capable of assuming any of an associated set of values. (adj) likely to change and/or vary; subject to variation; and/or changeable.
variable-focus—having the quality of adjustable focus in a single specified optic.
vary—to change, alter, and/or modify one or more characteristics and/or attributes of
via—by way of and/or utilizing; (n) an electrical connection between layers in a physical electronic circuit that goes through the plane of one or more adjacent layers.
voltage—(a.k.a., "potential difference" and "electro-motive force" (EMF)) a difference in electrical potential between any two conductors of an electrical circuit and/or a quantity, expressed as a signed number of Volts (V), and measured as a signed difference between two points in an electrical circuit which, when divided by the resistance in Ohms between those points, gives the current flowing between those points in Amperes, according to Ohm's Law.

wavefront—a surface containing points affected in substantially the same way by a wave at a substantially predetermined time.

weight—a force with which a body is attracted to Earth or another celestial body, equal to the product of the object's mass and the acceleration of gravity; and/or a factor and/or value assigned to a number in a computation, such as in determining an average, to make the number's effect on the computation reflect its importance, significance, preference, impact, etc.

when—at a time and/or during the time at which.

wherein—in regard to which; and; and/or in addition to.

width—a measurement of the extent of something: along an, often substantially horizontal, dimension; from side to side; and/or orthogonal to length and thickness.

with—accompanied by.

with regard to—about, regarding, relative to, and/or in relation to.

with respect to—about, regarding, relative to, and/or in relation to.

within—inside the limits of.

zone—a region and/or volume having at least one predetermined boundary.

Note

Various substantially and specifically practical and useful exemplary embodiments of the claimed subject matter are described herein, textually and/or graphically, including the best mode, if any, known to the inventor(s), for implementing the claimed subject matter by persons having ordinary skill in the art. References herein to "in one embodiment", "in an embodiment", or the like do not necessarily refer to the same embodiment.

Any of numerous possible variations (e.g., modifications, augmentations, embellishments, refinements, and/or enhancements, etc.), details (e.g., species, aspects, nuances, and/or elaborations, etc.), and/or equivalents (e.g., substitutions, replacements, combinations, and/or alternatives, etc.) of one or more embodiments described herein might become apparent upon reading this document to a person having ordinary skill in the art, relying upon his/her expertise and/or knowledge of the entirety of the art and without exercising undue experimentation. The inventor(s) expects any person having ordinary skill in the art, after obtaining authorization from the inventor(s), to implement such variations, details, and/or equivalents as appropriate, and the inventor(s) therefore intends for the claimed subject matter to be practiced other than as specifically described herein. Accordingly, as permitted by law, the claimed subject matter includes and covers all variations, details, and equivalents of that claimed subject matter. Moreover, as permitted by law, every combination of the herein described characteristics, functions, activities, substances, and/or structural elements, and all possible variations, details, and equivalents thereof, is encompassed by the claimed subject matter unless otherwise clearly indicated herein, clearly and specifically disclaimed, or otherwise clearly unsuitable, inoperable, or contradicted by context.

The use of any and all examples, or exemplary language (e.g., "such as") provided herein, is intended merely to better illuminate one or more embodiments and does not pose a limitation on the scope of any claimed subject matter unless otherwise stated. No language herein should be construed as indicating any non-claimed subject matter as essential to the practice of the claimed subject matter.

Thus, regardless of the content of any portion (e.g., title, field, background, summary, description, abstract, drawing figure, etc.) of this document, unless clearly specified to the contrary, such as via explicit definition, assertion, or argument, or clearly contradicted by context, with respect to any claim, whether of this document and/or any claim of any document claiming priority hereto, and whether originally presented or otherwise:

there is no requirement for the inclusion of any particular described characteristic, function, activity, substance, or structural element, for any particular sequence of activities, for any particular combination of substances, or for any particular interrelationship of elements;

no described characteristic, function, activity, substance, or structural element is "essential"; and within, among, and between any described embodiments:

any two or more described substances can be mixed, combined, reacted, separated, and/or segregated;

any described characteristic, function, activity, substance, component, and/or structural element, or any combination thereof, can be specifically included, duplicated, excluded, combined, reordered, reconfigured, integrated, and/or segregated;

any described interrelationship, sequence, and/or dependence between any described characteristics, functions, activities, substances, components, and/or structural elements can be omitted, changed, varied, and/or reordered;

any described activity can be performed manually, semi-automatically, and/or automatically;

any described activity can be repeated, performed by multiple entities, and/or performed in multiple jurisdictions.

The use of the terms "a", "an", "said", "the", and/or similar referents in the context of describing various embodiments (especially in the context of the following claims) are to be construed to cover both the singular and the plural, unless otherwise indicated herein or clearly contradicted by context.

The terms "comprising," "having," "including," and "containing" are to be construed as open-ended terms (i.e., meaning "including, but not limited to,") unless otherwise noted.

When any number or range is described herein, unless clearly stated otherwise, that number or range is approximate. Recitation of ranges of values herein are merely intended to serve as a shorthand method of referring individually to each separate value falling within the range, unless otherwise indicated herein, and each separate value and each separate sub-range defined by such separate values is incorporated into the specification as if it were individually recited herein. For example, if a range of 1 to 10 is described, that range includes all values therebetween, such as for example, 1.1, 2.5, 3.335, 5, 6.179, 8.9999, etc., and includes all sub-ranges therebetween, such as for example, 1 to 3.65, 2.8 to 8.14, 1.93 to 9, etc., even if those specific values or specific sub-ranges are not explicitly stated.

When any phrase (i.e., one or more words) appearing in a claim is followed by a drawing element number, that drawing element number is exemplary and non-limiting on claim scope.

No claim or claim element of this document is intended to invoke 35 USC 112(f) unless the precise phrase "means for" is followed by a gerund.

Any information in any material (e.g., a United States patent, United States patent application, book, article, web page, etc.) that has been incorporated by reference herein, is incorporated by reference herein in its entirety to its fullest enabling extent permitted by law yet only to the extent that no conflict exists between such information and the other definitions, statements, and/or drawings set forth herein. In the event of such conflict, including a conflict that would render invalid any claim herein or seeking priority hereto, then any such conflicting information in such material is specifically not incorporated by reference herein. Any specific information in any portion of any material that has been incorporated by reference herein that identifies, criticizes, or compares to any prior art is not incorporated by reference herein.

Applicant intends that each claim presented herein and at any point during the prosecution of this application, and in any application that claims priority hereto, defines a distinct patentable invention and that the scope of that invention must change commensurately if and as the scope of that claim changes during its prosecution. Thus, within this document, and during prosecution of any patent application related hereto, any reference to any claimed subject matter is intended to reference the precise language of the then-pending claimed subject matter at that particular point in time only.

Accordingly, every portion (e.g., title, field, background, summary, description, abstract, drawing figure, etc.) of this document, other than the claims themselves and any provided definitions of the phrases used therein, is to be regarded as illustrative in nature, and not as restrictive. The scope of subject matter protected by any claim of any patent that issues based on this document is defined and limited only by the precise language of that claim (and all legal equivalents thereof) and any provided definition of any phrase used in that claim, as informed by the context of this document when reasonably interpreted by a person having ordinary skill in the relevant art.

What is claimed is:

1. A tunable electro-optic lens device comprising:
   a first transparent substrate comprising a transparent conductive first electrode layer operatively connected thereto, the first electrode layer being patterned and comprising a first plurality of substantially concentric ring electrodes that form a first resistive divider network;
   a second transparent substrate comprising a transparent conductive second electrode layer operatively connected thereto; and
   an electro-active liquid crystal material layer located between the first transparent substrate and the second transparent substrate;
   wherein:
      a first ring electrode from the first plurality of ring electrodes is electrically connected to a substantially adjacent ring electrode from the first plurality of ring electrodes by a substantially co-planar first resistive arc that electrically spans a gap overlap zone defined by a spiralesque insulating gap that substantially separates the first ring electrode from the adjacent ring electrode;
      the spiralesque insulating gap extends more than one revolution, and less than two revolutions, substantially around a rotational axis of the at least one ring electrode to define the gap overlap zone;
      the gap overlap zone defines a gap overlap zone arc length and a gap overlap zone width;
      the gap overlap zone arc length defines a length of the first resistive arc and the gap overlap zone width defines a width of the first resistive arc;
      the first resistive arc defines a resistive path through the gap overlap zone; and
      a first sub-plurality of continuous ring electrodes from the first plurality of continuous ring electrodes is connected to a first input connection, the first input connection terminating an input line.

2. The tunable electro-optic lens device of claim 1, wherein:
   a resistance created by the first resistive arc is proportional to the length of the first resistive arc divided by the width of the first resistive arc.

3. The tunable electro-optic lens device of claim 1, wherein:
   the electro-optic lens device is tunable from a first optical power to a second optical power when a first voltage is applied to the first input connection.

4. The tunable electro-optic lens device of claim 1, wherein:
   the second electrode layer is not patterned.

5. The tunable electro-optic lens device of claim 1, wherein:
   the second electrode layer is patterned and comprises a second plurality of ring electrodes that form a second resistive divider network.

6. The tunable electro-optic lens device of claim 1, wherein:
   the first electrode layer comprises a plurality of sets of ring electrodes, each set comprising a corresponding plurality of ring electrodes.

7. The tunable electro-optic lens device of claim 1, wherein:
   the first electrode layer comprises a plurality of sets of ring electrodes, wherein:
      each set comprises a corresponding plurality of ring electrodes;
      a dedicated input connection is provided for each set; and
      a dedicated resistive arc is provided between each adjacent pair of ring electrodes in each set.

8. The tunable electro-optic lens device of claim 1, wherein:
   the first electrode layer comprises a plurality of sets of ring electrodes, wherein:
      each set comprises a corresponding plurality of ring electrodes;
      a dedicated input connection is provided for each set
      each set is adapted to be individually controlled; and
      a dedicated resistive arc is provided between each adjacent pair of ring electrodes in each set.

9. The tunable electro-optic lens device of claim 1, wherein:
   at least one ring electrode on the second transparent substrate completely covers in a planar direction at least two co-planar ring electrodes of the first transparent substrate.

10. The tunable electro-optic lens device of claim 1, wherein:
    the first electrode layer is adapted to create an index of refraction gradient in the electro-active liquid crystal material layer.

11. The tunable electro-optic lens device of claim 1, wherein:
    the first electrode layer is adapted to electrically cooperate with the second transparent conductive electrode layer to generate an electric field.

12. The tunable electro-optic lens device of claim 1, wherein:
the first electrode layer and the second electrode layer are adapted to electrically cooperate to generate an electric field across the electro-active liquid crystal material layer.

13. The tunable electro-optic lens device of claim 1, wherein:
the first electrode layer and the second electrode layer are adapted to electrically cooperate to generate a radially varying electric field across the electro-active liquid crystal material layer.

14. The tunable electro-optic lens device of claim 1, wherein:
the first electrode layer and the second electrode layer are adapted to electrically cooperate to generate a radial gradient in an index of refraction in the electro-active liquid crystal material layer.

15. The tunable electro-optic lens device of claim 1, wherein:
the first electrode structure is adapted to form a spherical lens.

16. The tunable electro-optic lens device of claim 1, wherein:
for each of the ring electrodes from the first plurality of substantially concentric ring electrodes, applying a predetermined voltage, an amplitude of the predetermined voltage unique to each of the ring electrodes from the first plurality of ring electrodes.

17. The tunable electro-optic lens device of claim 1, wherein:
the spiralesque insulating gap extends more than two revolutions substantially around the rotational axis of the at least one ring electrode.

18. The tunable electro-optic lens device of claim 1, wherein:
the spiralesque insulating gap extends between one revolution and ten revolutions substantially around the rotational axis of the at least one ring electrode.

19. The tunable electro-optic lens device of claim 1, wherein:
the gap overlap length extends from approximately 1 degree to approximately 360 degrees.

20. The tunable electro-optic lens device of claim 1, wherein:
the gap overlap length extends more than 360 degrees.

21. The tunable electro-optic lens device of claim 1, wherein:
a width of the first resistive arc is between approximately 0.1 microns and approximately 10 microns.

* * * * *